Figure 1:
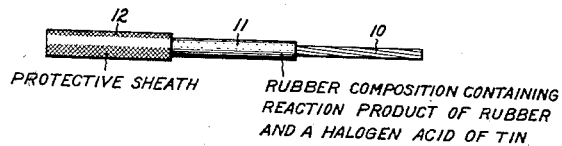

Jan. 6, 1942.   M. H. SAVAGE ET AL   2,269,230
ELECTRICAL CABLE
Filed July 29, 1938

Inventors:
Manuel H. Savage,
Lyman H. Hitchcock,
by Harry E. Dunham
Their Attorney.

Patented Jan. 6, 1942

2,269,230

UNITED STATES PATENT OFFICE 2,269,230

ELECTRICAL CABLE

Manuel H. Savage, Bridgeport, and Lyman H. Hitchcock, Milford, Conn., assignors to General Electric Company, a corporation of New York Application July 29, 1938, Serial No. 221,956

13 Claims. (Cl. 174—125)

This invention relates to electrical cables. It is concerned more particularly with insulated electrical cables having as insulation a novel insulating composition, which is flexible, is high in dielectric strength, in resistivity and in resistance to aging and water absorption, and is low in power factor and in specific inductive capacitance.

In the manufacture of certain types of electrical cables, particularly certain multi-conductor cables, it is necessary that the overall diameter of the cable be kept at a minimum. To attain this end the conductor must be insulated with a thin wall of insulation having a high dielectric strength and insulation resistance, for example with a thin wall of rubber or the like.

The extrusion of a thin wall of rubber in uniform wall thickness about a conducting core has involved considerable difficulty. To adapt the rubber for tubing about the wire, the rubber had to be milled. If overmilled, a soft sticky mass resulted. In this condition the rubber was difficult to extrude, and the vulcanized rubber had very poor physical properties. On the other hand, if the rubber were undermilled, the rubber-insulated conductor had a rough crepy surface which was not acceptable to the wire trade. Since the raw or crude rubbers vary among themselves in their properties, the optimum time of milling the crude rubber was difficult to predict. Even with the greatest care and the most skilled operators, the results of efforts to extrude thin walls of a rubber insulating composition were variable and, generally, unsatisfactory. To insulate a conductor with a thin wall of high dielectric strength rubber insulation it therefore has been common practice heretofore to pass the conductor through a bath of "creamed" rubber latex, in which has been incorporated the necessary vulcanizing agents, etc. The conductor had to be passed several times through such bath in order to build up the desired thickness of insulation. The process required close control and was expensive.

We have discovered a novel and relatively inexpensive composition which can be extruded about a wire and which provides an insulated conductor having properties equal to, and in certain respects even better than conductors insulated by dipping in rubber latex. Specifically, we have found that the above difficulties in the manufacture of so-called "thin-walled" rubber-insulated conductors can be obviated by incorporating into a rubber composition a reaction product of rubber and a halogen acid of tin, as for example hydrated chlorostannous acid ($HSnCl_3 \cdot 3H_2O$) or hydrated chlorostannic acid ($H_2SnCl_6 \cdot 2H_2O$). Such reaction products are described, for example, in Bruson Patent No. 1,797,188 and are produced and sold by The Goodyear Tire and Rubber Company, Akron, Ohio, under the trade name of "Pliolite." As a result of our discovery high dielectric strength, low loss, thin-walled insulated conductors of uniform wall thickness can be made at a materially lower processing cost and with greater flexibility and less control of operations than is possible in the production of latex-dipped insulated conductors.

The novel features which are characteristic of our invention are set forth in the appended claims. The invention itself, however, will best be understood from the following detailed description and the accompanying drawing illustrating by way of example specific embodiments of the invention.

Figure 2:
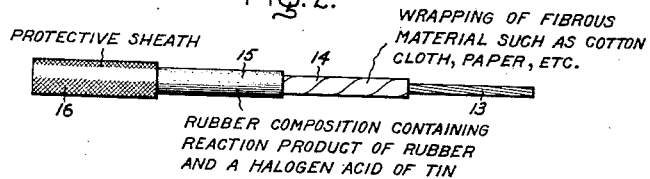
Figure 3:
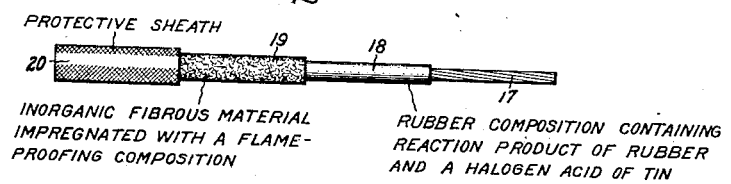

In the drawing Fig. 1 is a fragmentary view of a cable of the single-conductor type constructed in accordance with the invention, part of the insulation being shown as removed for purpose of clarity; and Figs. 2 and 3 are similar views of somewhat modified constructions of single-conductor cables in accordance with the invention.

The cable illustrated in Fig. 1 comprises a single conductor 10 which may be, for example, solid or stranded, plain or tinned copper wire. This conductor is insulated with a covering 11 of the new high dielectric strength rubber composition which will be described more fully hereafter. In most cases a protective sheath 12 envelops the whole, but in some instances it may be omitted. This sheath advantageously may take the form of a braid of soft cotton yarn or the like. Such braid may or may not be impregnated with standard flame-proofing and weather-proofing compounds, as desired or as conditions may require.

The cable illustrated in Fig. 2 differs from the cable of Fig. 1 by having a layer or wrapping 14 of conventional insulating material superposed directly on the conductor, and over this the new rubber composition. The layer 14 advantageously may take the form of a close wrapping of fibrous material such as cotton cloth, paper, etc. The elements designated by the numerals 13, 15 and 16 in Fig. 2 are comparable to those designated by the numerals 10, 11, and 12, respectively, in Fig. 1. As in the case of the cable shown in Fig. 1, the protective sheath 16 of the cable of Fig. 2 may be omitted for certain service applications.

The cable illustrated in Fig. 3 differs from the cable of Fig. 1 by having a layer or layers 19 of suitable fibrous material, preferably inorganic fibrous material, interposed between the covering 18 (formed of the new rubber composition) and the protective sheath 20, which is comparable to the sheath 12 of Fig. 1. The layer 15 advantageously may be formed of spun glass, mineral wool, asbestos, etc., but preferably comprises asbestos. This fibrous layer ordinarily is impregnated with a suitable flame-proofing and insulating composition, for example with halogenated aromatic carbon ring compound such as chlorinated naphthalene. Such halogenated compound has no detrimental effect upon the insulating covering 14. If desired, a layer or wrapping of conventional insulating material (comparable to that more fully described with reference to the numeral 14 of Fig. 2) may be superposed directly on the conductor 17, and the covering 18 applied over such layer. Also, for certain uses of the cable the protective sheath 20 may be omitted.

We have discovered that by incorporating into a rubber composition a reaction product of rubber and a hydrated halogen acid of tin, specifically an acid the negative portion of which comprises tin and chlorine, we obtain a material which has adequate plasticity for tubing upon wire and yet sufficient rigidity that the wire will remain accurately centered prior to and during vulcanization. Further, this reaction product appears to remove at extrusion temperatures, in a way which we do not as yet understand, the so-called "nerve" of milled unvulcanized rubber. As a result the composition can be extruded through a die without the crepe effect so common to pure gum compounds which have been milled severely enough to smooth out the surface.

As described in the aforementioned Bruson patent, rubber can be reacted with halogen acids of tin to form a halogenated mixture of polymers and degradation products of rubber. To obtain such a reaction product, a suitable amount of a halogen acid of tin, for example about 10 per cent of chlorostannic acid, is dispersed in rubber, for example by milling the two together upon conventional rubber rolls. The resulting product is heated at an elevated temperature until a reaction product has formed between the rubber and the chlorostannic acid, for instance for approximately 2 to 5 hours at about 130° to 150° C. Instead of incorporating the chlorostannic acid in the rubber by milling the two together, it may be added to a solution of rubber in a solvent such as benzene and reacted at boiling temperature, thereafter evaporating the solvent. Also, if desired, hydrated chlorostannous acid may be used in place of hydrated chlorostannic acid, or the bromostannic or bromostannous acids may be employed in place of the chloro derivatives of tin.

In carrying our invention into effect, it is convenient to mix the above reaction product with natural or synthetic rubber and to use this mixture (designated in the following formulas as "modified rubber") in preparing our new insulating compositions. This mixture advantageously comprises approximately equal percentages, by weight, of rubber-tin-halogen reaction product and rubber, suitably pale crepe rubber, although smoked sheet rubber or other grade of natural or synthetic rubber may be used, depending upon the particular properties desired in the finished insulating composition. Preferably the reaction product is one obtained by treating rubber with hydrated chlorostannic acid as previously described.

The rubber insulating composition of this invention comprises natural or synthetic rubber, preferably crude rubber of the grade known as pale crepe rubber; the above-described rubber-tin-halogen reaction product; and a suitable vulcanizing agent as, for example, sulfur, selenium or the like. Generally, the composition also contains one or more suitable vulcanization accelerators and a suitable accelerator activating agent which, depending upon the proportions employed, also may function as a reinforcing agent. The activating agent conveniently may be, for instance, zinc compounds such as zinc oxide, zinc carbonate, mixtures of zinc oxide and zinc carbonate, magnesium carbonate, and the like. Preferably the composition also contains a suitable anti-oxidant and a suitable plasticizer. The amount of rubber-tin-halogen reaction product in the composition should not be so high that the mass cannot be extruded about a conducting core at a suitable operating temperature, for instance at a temperature of the order of 160° to 210° F. In most cases the proportion of rubber-tin-halogen reaction product in the unvulcanized composition will be less than 40 per cent by weight of the total rubber and, preferably, is less than 30 per cent by weight thereof. More particularly it may be stated that we prefer that the new insulating composition be formed of the following ingredients within the limits stated:

| | Per cent by weight |
|---|---|
| Rubber, preferably pale crepe rubber | 50 to 80 |
| Modified rubber (50% rubber and 50% product of reacting rubber with halogen acid of tin, specifically with chlorostannic acid | 40 to 10 |
| Vulcanizing agent, preferably sulfur | 0.5 to 2 |
| One or more vulcanization accelerators | Up to 2 |
| Accelerator activating agent, preferably zinc oxide, zinc carbonate or mixtures thereof | Up to 10 |
| Anti-oxidant | Up to 2 |
| Plasticizer | Up to 2 |

In the above formula it will be noted that when the rubber content of the modified rubber is added to the amount of unmodified rubber the total amount thereof is from 70 to 85 per cent and the amount of the reaction product of rubber with halogen acid of tin is from 20 to 5 per cent.

As anti-oxidants we may use, for example, materials known to the trade as "Agerite White" (di-beta-napthyl-para-phenylenediamine), "Aminox" and "B. L. E." "Aminox" and "B. L. E." are ketone-amine reaction products. Generally, we use from 0.5 to 2 per cent of an anti-oxidant.

Examples of plasticizers which may be used are stearic acid, zinc laurate, vegetable oils such as palm oil, etc., mineral oils and waxes, etc. In certain cases the stearic acid also functions as an activator of the accelerator. Generally, from 0.5 to 2.0 per cent plasticizer is used.

As accelerators of vulcanization we may use, for example, such organic vulcanization accelerators as diphenyl guanidine, or materials known under the trade names of "Captax" (mercaptobenzothiazole), "Altax" (oxidation product of "Captax"), "Thionex" (tetra methyl thiuram monosulfide), "Zenite A" (mixture of zinc salt of mercaptobenzothiazole and "Thionex"), etc. Generally, we use from 1 to 2 per cent of such accelerators. We have obtained best results by using a mixture of accelerators consisting, by weight, of 1 part diphenyl guanidine, 1 part "Thionex" and 3 parts "Altax."

The following are more specific examples of our new insulating compositions, the accompanying test data showing in a general way how the physical and electrical properties of the composition may be varied by changes in the percentage proportions:

*Example 1*

| | Per cent by weight |
|---|---|
| Pale crepe rubber | 60.00 |
| Modified rubber (50% pale crepe rubber and 50% product of reacting rubber with chlorostannic acid) | 30.00 |
| Sulfur | 1.25 |
| Organic vulcanization accelerator | 1.00 |
| Zinc carbonate | 5.25 |
| Zinc oxide | 1.00 |
| Anti-oxidant | 1.00 |
| Plasticizer | 0.50 |

All of the above components, with the exception of the accelerator and sulfur, are mixed in a suitable mixer as, for example, a Banbury mixer in accordance with conventional rubber compounding practice. The compound preferably is aged for a suitable time, for instance for about 48 hours or more. The accelerator and sulfur are incorporated, prior to use, with the aged compound by any suitable means, for instance on a warming-up mill.

*Example 2*

| | Per cent by weight |
|---|---|
| Pale crepe rubber | 80.00 |
| Modified rubber (50% pale crepe rubber and 50% product of reacting rubber with chlorostannic acid) | 10.00 |
| Sulfur | 1.25 |
| Organic vulcanization accelerator | 1.25 |
| Zinc carbonate | 5.00 |
| Zinc oxide | 1.00 |
| Anti-oxidant | 1.00 |
| Plasticizer | 0.50 |

Essentially the same procedure is followed in compounding the above ingredients as described under Example 1.

Compositions produced in accordance with this invention are extruded in well known manner on conductors by means of standard tubing practice. For certain applications the composition may be sheeted on a calender and applied in the form of a tape to any electrical conductor or cable which conveniently may be insulated by such means. The rubber insulation is then vulcanized in place on the conductor. Generally speaking, the compositions of this invention are rapidly cured in a steam-pressure vulcanizer by exposing to a temperature of about 180° C. to 190° C. for from ½ to 2 minutes or more, depending upon the wall thickness of the rubber insulation, the kind and amount of accelerators used, the particular temperatures employed and other influencing factors.

Typical physical and electrical test data showing the properties of the vulcanized compositions of Examples 1 and 2 (tubed on 16 stranded, tinned copper wire, 1/64 inch wall of insulation) are shown below:

| | Product of Example 1 | Product of Example 2 |
|---|---|---|
| Original: | | |
| Elongation percent | 600 | 727 |
| Tensile strength in pounds per square inch | 4,000 | 5,000 |
| Set inch | 1/32 | 1/64 |
| After 96 hours in an oxygen bomb at 70° C. under a pressure of 300 pounds per square inch: | | |
| Elongation percent | 575 | 700 |
| Tensile strength in pounds per square inch | 3,750 | 4,380 |
| After 7 days in a Geer oven at 70° C.: | | |
| Elongation percent | 490 | 600 |
| Tensile strength in pounds per square inch | 3,520 | 3,900 |
| Insulation resistance, after one hour's immersion in tap water at 15.5° C., 250 ft. lengths | 12,000 to 28,000 megohms per 1,000 feet | 12,000 to 14,000 megohms per 1,000 feet |
| Dielectric strength after voltage test* | Approximately 1,000 volts per mil | Approximately 700 volts per mil |

*Note.—The voltage test comprised the application of 7,000 volts for 1 minute after immersion of the sample in tap water at 15.5° C. for 1 hour.

The procedures for making elongation, tensile strength and set tests are described under specification D-27-37T of the American Society for Testing Materials. The tensile strength test was made on a Scott tensile strength machine with jaws modified to prevent abrasion of the sample at the point of contact.

The power factor at 1,000 cycles, 10 volts, of representative samples of both compounds is of the order of 0.0034 when measured dry on a 4½-inch disk at 28° C. and approximately 0.0064 after 24 hours' immersion in distilled water. With continued immersion, the power factor drops to about 0.005 at the end of 7 days, to about 0.0048 at the end of 14 days and thereafter remains practically unchanged upon further immersion. The specific inductive capacitance of representative samples, when measured dry on a 4½-inch disk at 28° C., is of the order of 2.5. After immersion for 24 hours in distilled water, it is about 2.7; after 7 days' immersion, about 2.8; after 14 days' immersion, about 2.9; and after 21 days' immersion, about 3.0.

As shown by the foregoing the material of Example 2 is somewhat better in physical characteristics than the product of Example 1. The advantage of the Example 1 compound, however, is the fact that up to 14 days' immersion in water it shows a gradual gain in insulation resistance and a very low increase in specific inductive capacitance. The Example 2 product behaves more like a conventional rubber compound in that it yields lower insulation resistance values upon prolonged immersion in water.

Any suitable rubber hydrocarbon may be used in producing the new insulating compositions. In certain cases it is desirable to use deproteinized rubber in lieu of all or a substantial part of the crude rubber. In this way a material of exceptional resistance to the absorption of water is obtained.

Conductors insulated in accordance with the present invention are especially adapted for use in manufacturing multi-conductor cables for supervisory-control, telephone, police-signal, fire-alarm, automatic lights, and other control circuits for voltages up to 220 A. C. or 450 D. C. Because of the high dielectric strength and high insulation resistance of the new compositions, cables can be built with a smaller overall diameter than when insulated with an ordinary rubber compound, thus saving duct space. A smaller diameter means less lead (or other protective covering) and consequently a saving in the cost of such cable.

The insulated conductors of this invention are equal, and in certain respects even better than latex-insulated conductors. Further, they can be made more economically than conductors covered with latex insulation.

What we claim as new and desire to secure by Letters Patent of the United States is:

1. An insulated electrical conductor comprising a metallic conducting core and a continuous covering of flexible thin-walled insulation of substantially uniform wall thickness enveloping said core, said insulation being the product of vulcanizing a composition having sufficient rigidity as to maintain the conducting core accurately centered during vulcanization in situ on said core, the said composition comprising 70 to 85% by weight of rubber, a reaction product of rubber and a halogen acid of tin, and a vulcanizing agent, said reaction product constituting not exceeding substantially 40 per cent by weight of the rubber in said composition.

2. An electrical cable comprising a metallic conducting core and superimposed directly thereon an extruded, flexible, continuous, non-crepy, uniform layer of high dielectric strength, low loss, thin-walled insulation, said insulation comprising the product of vulcanizing a composition comprising 70 to 85% by weight of rubber and a vulcanizing agent, a vulcanization accelerator, an accelerator activating agent, and a reaction product of rubber and a halogen acid of tin, said reaction product constituting not exceeding substantially 30 per cent by weight of the rubber in the said composition, said composition being extrudable in thin, uniform, smooth-surfaced layers about a conducting core.

3. An electrical cable comprising an electrical conductor with insulation thereon comprising a thin-walled, flexible, extruded insulating covering of uniform thickness, the said covering being the vulcanized product of

| | Per cent by weight |
|---|---|
| Rubber | 70 to 85 |
| Reaction product of rubber and halogen acid of tin | 20 to 5 |
| Sulfur | 0.5 to 2 |
| Organic vulcanization accelerator | Up to 2 |
| Accelerator activating agent | Up to 10 |
| Anti-oxidant | Up to 2 |

4. An electrical cable comprising an electrical conductor, an outer protective sheath, and a flexible, extruded, thin-walled covering of a high dielectric strength insulating composition of uniform wall thickness superposed directly on the said conductor, said insulating composition being the vulcanized product of

| | Per cent by weight |
|---|---|
| Rubber | 70 to 85 |
| Reaction product of rubber and halogen acid of tin | 20 to 5 |
| Sulfur | 0.5 to 2 |
| Organic vulcanization accelerator | Up to 2 |
| Accelerator activating agent | Up to 10 |
| Anti-oxidant | Up to 2 |
| Plasticizer | Up to 2 |

5. An electrical cable comprising a metallic conductor, a conventional insulating material superposed directly on the said conductor, an outer protective sheath, and a covering of a flexible, high dielectric strength insulating composition superposed directly upon the said conventional insulating material, said composition being the vulcanized product of

| | Per cent by weight |
|---|---|
| Rubber | 70 to 85 |
| Reaction product of rubber and chlorinated acid of tin | 20 to 5 |
| Sulfur | 0.5 to 2 |
| Organic vulcanization accelerator | Up to 2 |
| Accelerator activating agent | Up to 10 |
| Anti-oxidant | Up to 2 |
| Plasticizer | Up to 2 | said activating agent being a zinc compound selected from the class consisting of zinc oxide, zinc carbonate and mixtures of zinc oxide and zinc carbonate, said composition prior to vulcanization possessing adequate plasticity for extrusion upon a wire in the form of thin-walled, smooth-surfaced layer and sufficient rigidity that the wire will remain centered in the extruded composition prior to and during vulcanization of said composition.

6. An electrical cable comprising a metallic conductor, a flexible, thin-walled covering of a high dielectric strength insulating composition superposed directly on the said conductor, said insulating composition being the vulcanized product of

| | Per cent by weight |
|---|---|
| Rubber | 70 to 85 |
| Reaction product of rubber and chlorostannic acid | 20 to 5 |
| Sulfur | 0.5 to 2 |
| Organic vulcanization accelerator | Up to 2 |
| Accelerator activating agent | Up to 10 |
| Anti-oxidant | Up to 2 |
| Plasticizer | Up to 2 | said activating agent being a zinc compound selected from the class consisting of zinc oxide, zinc carbonate and mixtures of zinc oxide and zinc carbonate, a covering of inorganic fibrous material impregnated with a flame-proofing agent over the said insulating composition, and an outer protective sheath enveloping the whole, said composition prior to vulcanization being extrudable about a conducting core in the form of a thin-walled, smooth-surfaced covering of uniform wall thickness.

7. A flexible high dielectric strength insulating material which is the product of vulcanizing an extrudable composition extrudable to form a thin, uniform, smooth-surfaced layer on a wire, the said composition comprising 70 to 85% by weight of rubber, a reaction product of rubber and a halogen acid of tin, and a vulcanizing agent, said reaction product constituting not exceeding substantially 40 per cent by weight of the rubber in the said composition.

8. A high dielectric strength flexible insulating material extrudable prior to vulcanization to form a thin-walled, uniform, smooth-surfaced covering about a wire, said material being the vulcanized product of

| | Per cent by weight |
|---|---|
| Rubber | 70 to 85 |
| Reaction product of rubber and halogenated acid of tin | 20 to 5 |
| Sulfur | 0.5 to 2 |
| Organic vulcanization accelerator | Up to 2 |
| Accelerator activating agent | Up to 10 |
| Anti-oxidant | Up to 2 |
| Plasticizer | Up to 2 |

9. A high dielectric strength flexible insulating composition of low water-absorption characteristics, said composition having sufficient plasticity as to be extrudable in the form of a thin wall upon a conducting core, having sufficient rigidity as to maintain the conductor accurately centered during vulcanization in situ of the extruded composition and being the vulcanized product of

| | Per cent by weight |
|---|---|
| Deproteinized rubber | 70 to 85 |
| Reaction product of rubber and chlorinated acid of tin | 20 to 5 |
| Sulfur | 0.5 to 2 |
| Organic vulcanization accelerator | Up to 2 |
| Accelerator activating agent | Up to 10 |
| Anti-oxidant | Up to 2 |
| Plasticizer | Up to 2 |

10. A flexible electrically insulating material comprising the product of vulcanizing a composition comprising a vulcanizing agent, at least 70 per cent by weight of rubber and from 5 to 20% by weight of a reaction product of rubber and halogenated acid of tin in an amount not exceeding substantially 30 per cent by weight of the rubber, said composition having adequate plasticity for the extrusion thereof in the form of a continuous, thin-walled, non-crepy covering upon a wire and having sufficient rigidity that the wire will remain centered prior to and during vulcanization of the composition on the wire.

11. A flexible electrically insulating material comprising the product of vulcanizing a composition comprising a vulcanizing agent, from 70 to 85 per cent by weight of rubber, and a reaction product of rubber and halogenated acid of tin in an amount less than 30 per cent by weight of the rubber, said composition having adequate plasticity for the extrusion thereof in the form of a continuous, thin-walled, non-crepy covering upon a wire and having sufficient rigidity that the wire will remain centered prior to and during vulcanization of the composition on the wire.

12. A low loss, high dielectric strength flexible insulating material consisting of the product of vulcanizing an extrudable composition comprising a vulcanizing agent, from 70 to 85 per cent by weight of rubber and from 20 to 5 per cent by weight of a reaction product of rubber and halogenated acid of tin, said composition having adequate plasticity for the extrusion thereof in the form of a continuous, thin-walled, non-crepy covering upon a wire and having sufficient rigidity that the wire will remain centered prior to and during vulcanization of the composition on the wire.

13. An insulating material as in claim 8 wherein the reaction product of rubber and halogenated acid of tin is the reaction product of rubber and chlorinated acid of tin.

MANUEL H. SAVAGE.
LYMAN H. HITCHCOCK.